US012702922B2

(12) United States Patent
Hume et al.

(10) Patent No.: US 12,702,922 B2
(45) Date of Patent: Aug. 11, 2026

(54) METHOD AND SYSTEM TO REDUCE LATENCY IN CLOUD GAMING

(71) Applicant: Sony Interactive Entertainment Europe Limited, London (GB)

(72) Inventors: Oliver Hume, London (GB); Philip Cockram, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 216 days.

(21) Appl. No.: 18/592,748

(22) Filed: Mar. 1, 2024

(65) Prior Publication Data

US 2024/0293739 A1 Sep. 5, 2024

(30) Foreign Application Priority Data

Mar. 2, 2023 (GB) ..................................... 2303099

(51) Int. Cl.
*A63F 13/358* (2014.01)
*A63F 13/285* (2014.01)
*A63F 13/335* (2014.01)
*A63F 13/50* (2014.01)

(52) U.S. Cl.
CPC .......... *A63F 13/358* (2014.09); *A63F 13/285* (2014.09); *A63F 13/335* (2014.09); *A63F 13/50* (2014.09)

(58) Field of Classification Search
CPC .... A63F 13/358; A63F 13/285; A63F 13/335; A63F 13/50; A63F 13/355; A63F 13/54; A63F 13/70; G06F 3/016
See application file for complete search history.

(56) References Cited

U.S. PATENT DOCUMENTS 8,170,701 B1 * 5/2012 Lu ......................... A63F 13/355 700/94
8,508,469 B1 * 8/2013 Rosenberg ............. G01B 21/04 345/156
10,814,227 B2 * 10/2020 Colenbrander ......... A63F 13/79
11,123,634 B1 * 9/2021 Griffais ................. A63F 13/352
2013/0024545 A1 1/2013 Sheppard et al.

(Continued)

OTHER PUBLICATIONS

Combined Search and Examination Report for Appln. No. GB2303099.2 dated Sep. 4, 2023, pp. 1-7.

(Continued)

*Primary Examiner* — Grant Sitta
(74) *Attorney, Agent, or Firm* — Fish & Richardson P.C.

(57) ABSTRACT

The invention provides a computer-implemented method of reducing latency in a cloud gaming system, the cloud gaming system comprising a local user device and a connected remote server, the method comprising: receiving a user input at the user device, wherein the user input initiates a gameplay event, the gameplay event comprising a visual output and one or both of an audio output and a haptic output, each to be outputted locally at the local user device; processing graphical data remotely at a processing unit of the server to provide the visual output of the gameplay event; and processing one or both of audio data and haptic data locally at a processing unit of the user device to provide the one or both of the audio output and the haptic output of the gameplay event respectively.

20 Claims, 6 Drawing Sheets

(56) References Cited

U.S. PATENT DOCUMENTS

| | | | | |
|---|---|---|---|---|
| 2013/0198625 | A1* | 8/2013 | Anderson | G06F 3/016<br>715/701 |
| 2014/0035736 | A1* | 2/2014 | Weddle | G05D 1/005<br>340/407.2 |
| 2016/0080442 | A1* | 3/2016 | Justice | A63F 13/77<br>709/219 |
| 2016/0219325 | A1* | 7/2016 | Chu | A63F 13/35 |
| 2017/0050110 | A1* | 2/2017 | Perry | A63F 13/48 |
| 2017/0050111 | A1* | 2/2017 | Perry | H04L 67/131 |
| 2017/0092084 | A1* | 3/2017 | Rihn | G06F 3/167 |
| 2018/0066636 | A1* | 3/2018 | Khoshkava | C22F 1/006 |
| 2018/0290054 | A1 | 10/2018 | Perry et al. | |
| 2019/0118098 | A1* | 4/2019 | Payzer | A63F 13/77 |
| 2019/0321725 | A1 | 10/2019 | Zimring et al. | |
| 2020/0316464 | A1* | 10/2020 | Butler | A63F 13/352 |
| 2021/0037288 | A1* | 2/2021 | Osman | H04N 21/81 |
| 2021/0097641 | A1* | 4/2021 | Lyer | A63F 13/60 |
| 2021/0146241 | A1* | 5/2021 | Bleasdale-Shepherd | G06N 20/00 |
| 2021/0245047 | A1 | 8/2021 | Dharmapurikar et al. | |
| 2022/0258052 | A1* | 8/2022 | Kosai | G06T 7/20 |

OTHER PUBLICATIONS

Extended European Search Report in European Appln. No. 24159582.6, mailed on Jul. 15, 2024, 6 pages.

* cited by examiner

METHOD AND SYSTEM TO REDUCE LATENCY IN CLOUD GAMING

CROSS-REFERENCE TO RELATED APPLICATION

The present application claims priority from United Kingdom Patent Application No. GB2303099.2, filed Mar. 2, 2023, the disclosure of which is hereby incorporated herein by reference.

FIELD OF THE INVENTION

The invention relates to cloud computing and, specifically, to reduced latency cloud gaming platforms.

BACKGROUND

Cloud computing is the provision of cloud services, such as computer processing and storage means, to users via a network connection. The processing and storing of user data occurs at a remote server and/or a data center.

One application of cloud computing is cloud gaming (or 'gaming-as-a-service'), wherein users can stream and play video games using a remotely connected display device, such as a smart television, personal computer or smartphone, and a locally connected controller. Particularly, cloud gaming involves receiving a user input at the controller; transmitting the input via a network connection to a specialised gaming server where it is processed; generating gameplay events that result from the input and its associated interactions within the game; and livestreaming the resulting audio, visual and haptic content back to the display device and controller. Further, gameplay events are exclusively reactive, that is, a response is generated (wholly at the remote server) only when an action has been taken by the user.

This has provided advantages over non-cloud-based video games, wherein the video game processing occurs wholly locally. Such advantages have included: instant access to a variety of high-end video games without long installations or updates; minimal use of storage capacity at the user end; straightforward access to online multiplayer gaming; reduced hardware requirements and associated costs for users; and permitting newer, graphics-heavy games to be played through legacy devices without the need for a high-end video game console.

However, hosting video game data and program code remotely in the cloud has also given rise to a number of challenges and drawbacks, particularly in relation to the low-latency requirements of many modern video games. For example, first-person shooter (FPS) games and multiplayer online battle arena (MOBA) games require that users can respond quickly and precisely to gameplay events occurring in their virtual vicinity. These games therefore require high-speed, high-bandwidth internet connectivity and, even then, full audio, visual and haptic fidelity is still not possible without installing games onto a console or another local storage medium. Specifically, there is an appreciable latency (or 'time lag') perceived by the user between their input to the controller and the audio, visual and haptic content which is then generated remotely at the server before being livestreamed back to the user wear is it rendered locally.

Accordingly, there is an urgent need in the art to address these latency-related drawbacks to cloud gaming.

SUMMARY

An object of the invention is to provide a method of reducing latency in a cloud gaming system and a system of implementing this method, thereby mitigating the above drawbacks. The invention is directed to the processing and storing of audio and haptic content in previously underutilised user devices. This is made possible as this content demands, in comparison to the visual content, much less processing power and storage capacity in a known modern video game. A technical solution of the invention is to advantageously separate the audio and haptic content from the visual/graphical content in order that the audio and/or haptic data may be processed, outputted, and rendered locally, thereby reducing a latency perceived the user. The visual signals, these demanding much greater processing power and storage capacity that may not be provided in typical local devices, may be processed remotely. A further technical solution of the invention is to use a method of pre-emptive (that is, probabilistic) caching of the likely upcoming audio/haptic content to reduce a latency perceived by the user.

In a first aspect of the invention, there is provided a computer-implemented method of reducing latency in a cloud gaming system, the cloud gaming system comprising a local user device and a connected remote server, the method comprising: receiving a user input at the user device, wherein the user input initiates a gameplay event, the gameplay event comprising a visual output and one or both of an audio output and a haptic output, each to be outputted locally at the local user device; processing graphical data remotely at a processing unit of the server to provide the visual output of the gameplay event; and processing one or both of audio data and haptic data locally at a processing unit of the user device to provide the one or both of the audio output and the haptic output of the gameplay event respectively.

In a preferred embodiment of the first aspect, the graphical data is stored remotely at a memory unit of the server and the one or both of the audio data and the haptic data is stored locally at a memory unit of the user device. In a further preferred embodiment of the first aspect, the graphical data and the one or both of the audio data and the haptic data are stored remotely at a memory unit of the server, and wherein the one or both of the audio data and the haptic data is retrieved from the server and stored locally at a memory unit of the user device to be processed locally at a processing unit of the user device.

This method thereby involves separating the visual and audio/haptic processing functionalities in a cloud gaming scenario, thereby allowing for the audio and haptic content, i.e., the vastly smaller outputs in comparison to the visual outputs, to be in certain cases processed locally and cached ready for outputting to the user. In other words, rather than processing both the visual data and the audio and/or haptic data at the remote server, wherein an appreciable latency would be perceived by the user, the method comprises processing the audio and/or haptic data, or parts thereof, locally.

In a preferred embodiment of the first aspect, the method further comprises: during gameplay and prior to receiving a user input initiating the gameplay event, calculating a probability of the gameplay event occurring and, if the probability is greater than a threshold probability, retrieving the one or both of the audio data and the haptic data from the server and storing it or them locally at the memory unit of the user device to be processed locally at the processing unit of the user device. This thereby reduces the user's sense of the lag between their input commands and the rendered outputs they perceive.

In a preferred embodiment of the first aspect, the method further comprises: during gameplay and prior to receiving a user input initiating the gameplay event, calculating a probability of the gameplay event occurring and, if the probability is greater than a threshold probability, processing the one or both of the audio data and the haptic data locally at the processing unit of the user device to provide the one or both of the audio output and the haptic output of the gameplay event respectively. This thereby reduces the user's sense of the lag between their input commands and the rendered outputs they perceive.

In a preferred embodiment of the first aspect, the method further comprises: during gameplay and prior to receiving a user input initiating the gameplay event, outputting the one or both of the audio output and the haptic output. The likely audio and/or haptic output corresponding to the likely gameplay event may thereby be output and rendered before the user has taken the associated input action.

In a preferred embodiment of the first aspect, the user device comprises a display device arranged to output the visual output and one or both of an audio generation device arranged to output the audio output and a haptic actuator arranged to output the haptic output.

In a preferred embodiment of the first aspect, the probability of the gameplay event occurring is calculated based one or more of: the user inputs received in a preceding time period; data associated with the gameplay events occurring in a preceding time period; data relating to the current state or progression of the gameplay; and data associated with the user's gameplay history.

In a preferred embodiment of the first aspect, the probability is calculated using an algorithm, wherein the algorithm comprises one or more of a confidence estimation; machine learning algorithm; a deep learning algorithm; and other statistical analysis methods. The predictive abilities of the invention are thereby improved using these techniques. The accuracy of the predicted audio and/or haptic output could be further improved by moderating said output(s) using, or by learning from, the corresponding original audio and/or haptic that would be streamed from the server or a part of said output(s).

In a preferred embodiment of the first aspect, the local storing of the one or both of the audio data and the haptic data comprises caching in a cache memory of the memory unit of the local user device. This may usefully improve latency as cache memory, when compared with slower-access primary memory, is faster access and permits the full utilization of processing unit speeds.

In a preferred embodiment of the first aspect, the user device further comprises a controller arranged to receive the user input initiating the gameplay event.

The features of the preferred embodiments described in relation to the first aspect of the invention may equally be implemented in the following second and thirst aspects according to the invention.

In a second aspect of the invention, there is provided a system configured to reduce latency in a cloud gaming system, the cloud gaming system comprising a local user device and a connected remote server, wherein the system is configured to carry out any method described herein.

In a third aspect of the invention, there is provided a computer program comprising instructions that, when executed, cause the computer to carry out the steps of any method described herein.

BRIEF DESCRIPTION OF THE DRAWINGS

Exemplary embodiments of the invention will now be described by way of example, with reference to the accompanying drawings, wherein.

DETAILED DESCRIPTION

Figure 1:
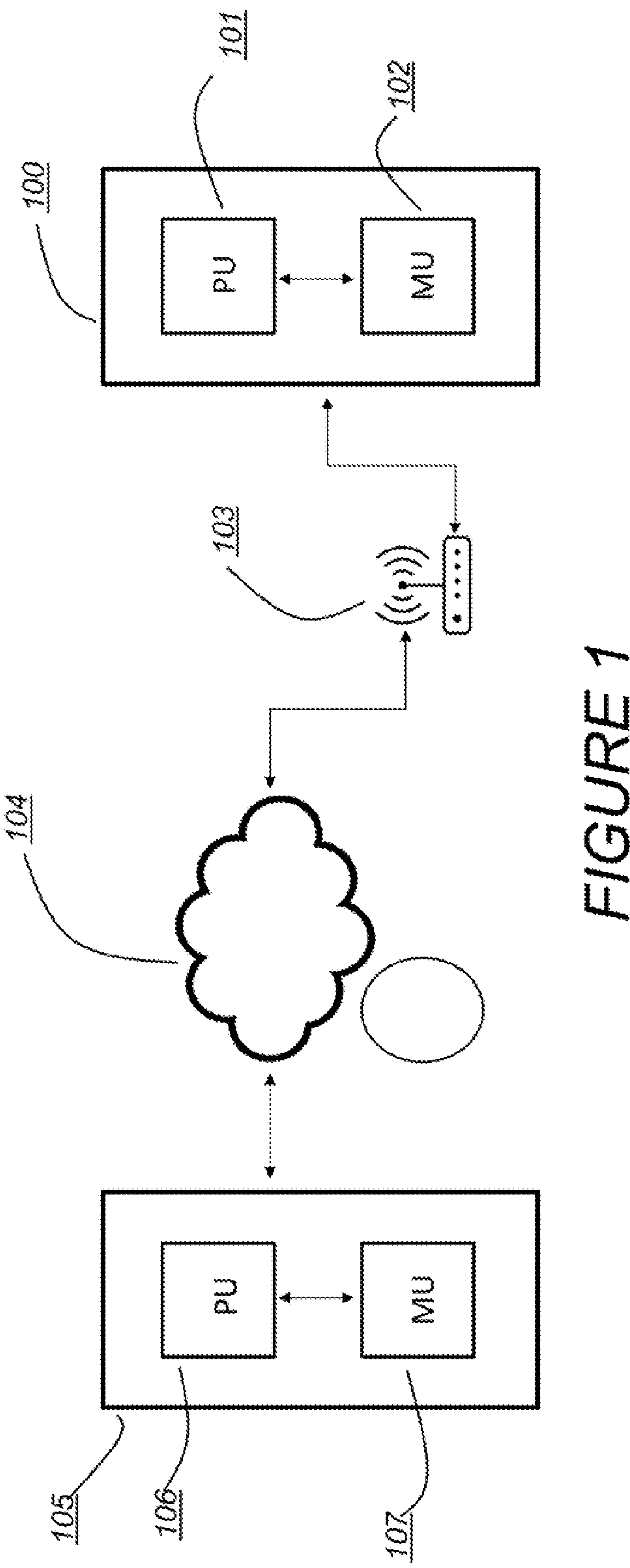
FIG. 1 illustrates in schematic form an exemplary cloud gaming system.

Referring to FIG. 1, there is provided an exemplary cloud gaming system comprising a local user device 100 and a remote server 105 connected thereto via a network and other interface apparatuses. The network is typically the internet but may be any packet-switched network. The interface apparatuses may comprise a local router 103 and a cloud computing network 104.

Figure 2:
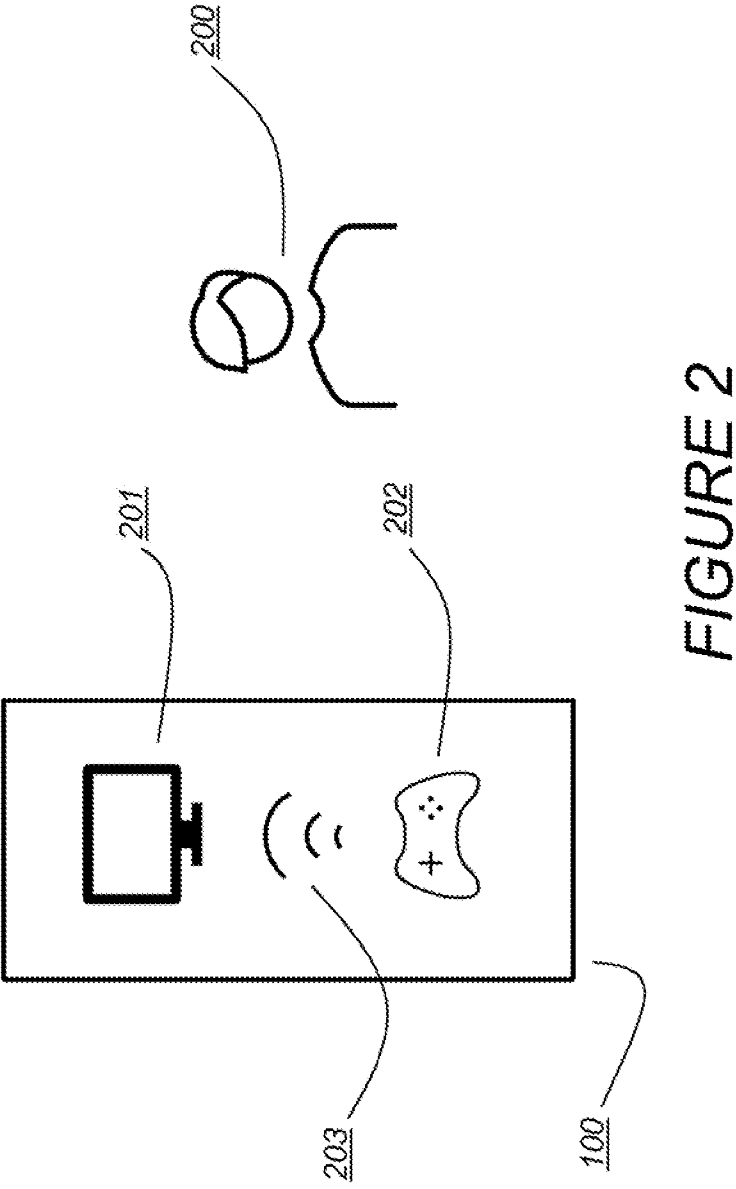
FIG. 2 illustrates in schematic form a user with an exemplary user device.

The cloud gaming system is configured to execute a cloud-based video game. The cloud-based video game may be any video game or computer game having cloud-based aspects, that is, at least part of the program code, data storage, and/or execution of the video game is at the server 105 and thence accessed remotely by the user device 100. The gameplay comprises a sequence of gameplay events rendered by the user device 100. When used herein, the gameplay may be understood to mean the aspects of a cloud-based video game relating to the plot, rules, objectives, and the overall nature of a user's 200 (as illustrated in FIG. 2) interaction with the game. For example, in the scenario of a FPS game, the gameplay may refer to the journey through or objectives sought in the game, or a particular level/map thereof. A gameplay event may then refer to a user avatar taking a particular left or right turn, or a non-player character (NPC) reacting to a given action taken by a user avatar.

Specific gameplay events typically comprise specific audio, visual and haptic content. This content may in turn comprise respective audio, visual and haptic data (referring to said content before processing), and respective audio, visual and haptic outputs (referring to said content after processing). In a cloud gaming architecture, the data may refer to data files stored in a memory which are to be processed by a processor. These data files are typically raw media files (that is, audio, visual and haptic related files). Data files may be stored in a variety of file formats in a variety of storage media. Such file formats include, but are not limited to, riff, mp3, ogg, wav, and aac for audio data; png, jpg, and tga for visual data; and other formats known per se in the art for haptic data. On the other hand, the outputs may refer to processed signals which are to be rendered by the user device 100. These processed signals are typically the sound (that is, audio), computer graphics (that is, visual), and mechanical feedback (that is, haptic) signals that may be rendered and in turn perceived.

For example, in the scenario of a FPS game, visual data may refer to a data file comprising a 3D computer graphics model of a non-player character (NPC) representing an enemy guardsman. The graphics model is a stored mathematical representation of the enemy guardsman that may include details relating to clothing, complexion, stature, facial expression, and the like. Visual outputs may then refer to a computer-generated image (CGI) signal, or other graphics-related signal, when processed and/or configured for a particular gameplay event, such as the enemy guardsman moving/standing in a particular manner according to the particular gameplay occurring. To be able to render such visual outputs typically requires the step of processing the original (that is, underlying) visual data file in order that the rendered game graphics correspond to the user inputs and associated gameplay. Analogous examples may be contemplated for audio data/outputs and haptic data/outputs.

Audio content, when used herein, should be distinguished from speech or 'voicechat'. Speech may be understood to mean sounds that are uttered by the user 200, as opposed to the audio otherwise associated with the gameplay events described herein. Likewise, visual content, when used herein, should be distinguished from other content such as webcam footage that may be livestreamed during gameplay among players.

The local user device 100 is a client device that may be operated by the user 200. Local, when used herein, may be understood to mean at the client end, that is, the user end. The user device typically enables the user 200 to perceive the audio, visual and haptic outputs of the cloud-based video game and to interact with the cloud-based video game. The user device 100 may be, or comprise, a desktop computer; a laptop computer; a tablet computer; a smartphone; a smart television; and the like. The user device 100 may have a network interface which communicably connects the user device 100 to the network via the local router 103. The network interface is configured to receive livestreamed audio, visual and haptic content from the network and to transmit user input data to the network for further transmission to the server 105. Streaming, when used herein, may be understood to mean the transmission of multimedia outputs, typically via the internet. Livestreaming may be understood to mean streaming in real-time. User input data includes any data which may be inputted to the user device 100 by the user 200 when interacting with the cloud-based video game.

The user device 100 comprises the processing unit (PU) 101 and the memory unit (MU) 102 connected thereto. The PU 101 is configured to decode audio, visual and haptic content being received from the network or encode user input data being transmitted to the network; and further to process audio and haptic content according to the method described herein. The MU 102 is configured to store audio, visual and haptic content, and other data, locally. The PU 101 and MU 102 may be locally distributed computing and storage means respectively. Locally distributed, when used herein, may be understood to mean achieved by one or more local artefacts. For example, the user device 100 may comprise other devices (for example, devices configured to generate audio outputs, display visual outputs, and actuate haptic outputs respectively) wherein computing and storage means are achieved locally, and wherein said local means may be taken together to form the respective PU 101 and MU 102 of the user device 100. Such devices are illustrated in FIG. 2.

The MU 102 of the user device may be, or comprise, a 'cache memory' for caching audio and/or haptic content. In an embodiment where the MU 102 comprises cache memory, it may or may not also comprise primary memory, and vice versa. Cache memory is typically a faster-access memory of smaller storage capacity, when compared to 'primary memory', and is typically used as a buffer. Cache memory is useful as, without it, the slower-access primary memory may prevent the PU 101 from being fully utilised. In other words, the latency caused by a primary memory would otherwise cause the faster processing speed of the PU 101 to be underutilised, and this may usefully be avoided by using a cache memory.

The remote server 105 is a specialised gaming server. Remote, when used herein, is understood to mean at the provider end. The server 105 is typically configured to execute program code of the cloud-based video game according to the gameplay. The server 105 is typically housed and operated within a data center (not shown). The server 105 may have a network interface which communicably connects the server 105 to the network. The network interface is configured to transmit (that is, livestream) audio, visual and haptic content to the network for further transmission to the user device 100 and to receive user input data from the network.

The server 105 comprises a PU 106 and a MU 107 connected thereto. The PU 106 is configured to decode user input data being received from the network or encode audio, visual and haptic content being transmitted to the network; and further to process audio and haptic content according to the method described herein. The PU 106 may in turn comprise one or more central processing units (CPUs) and graphics processing units (GPUs). The MU 107 is configured to store audio, visual and haptic content, and other data, remotely. The server 105 may further comprise application-specific integrated circuit (ASIC) chips; input/output (I/O) devices; and the like. In itself, a typical server configured for use in a typical cloud computing system is known per se in the art and so further detailed explanations are omitted here.

It is noted that, although the graphical data is typically stored remotely at the MU 107 of the server 105, the audio data and the haptic data may be stored locally at the MU 102 of the user device 100 and/or stored remotely at the MU 107 of the server 105. In the case of the latter scenario, the audio data and/or the haptic data is typically retrieved from the server 105 for subsequent local storing at the MU 102 of the user device 100 to be processed locally at the PU 101 of the user device 100. Further, the MU 102 of the user device may be, or comprise, a 'cache memory' for caching the audio and/or haptic data. Retrieve, when used herein, may be understood to mean the retrieval of data/raw data files from the server 105 to the user device 100 prior to processing, as distinct from (live) stream which refers to transmission of multimedia outputs.

Referring to FIG. 2, there is provided a user 200 with an exemplary user device 100, further comprising a display device 201, a controller 202, and an audio generation device (not shown) connected therebetween via a local network 203.

The local network 203 communicably couples the display device 201, the controller 202, and the audio generation device. The couplings may be wired or wireless and may involve an intermediate network, for example, the internet or a local/personal area network.

As illustrated in FIG. 1, the PU 101 and MU 102 may comprise locally distributed computing and storage means respectively. In other words, the user device 100 may comprise other devices (for example, devices configured to generate audio outputs, display visual outputs, and actuate haptic outputs respectively) having computing and storage resources which may be taken together to form the respective PU 101 and MU 102 of the user device 100. These devices are further configured to receive the audio, visual and haptic outputs and render them such that they may be perceived by the user 200. These renderings may be sound (according to an audio output), computer graphics (according to a visual output), and mechanical feedback (according to a haptic output).

The display device 201 is typically configured to display computer graphics for the user 200 according to received visual output signals corresponding to the gameplay events occurring. In the illustrated example, display device 201 is a television screen. However, the invention is not limited in this regard. Display device 201 may alternatively be a virtual reality headset worn by the user 200; a display of a laptop; a display of a tablet computer; a display of a desktop computer; a display of a mobile phone; a holographic projector; an in-vehicle display such as a satellite navigation system display or a cinema screen; and the like.

The controller 202 is typically configured to enable the user 200 to interact with the cloud-based video game. The controller 202 may comprise a haptic actuator configured to actuate mechanical feedback for the user 200 according to received haptic signals corresponding to the gameplay events occurring. In the illustrated example, the controller 202 is a game console controller. The controller 202 may be of any type known or developed in future, and in particular may be from the Sony PlayStation® series of controllers. However, the invention is not limited in this regard. The controller 202 may take many alternative forms including, but not limited to, a voice command interface, a touchscreen, a computer mouse and/or keyboard, a gesture recognition interface, and the like.

The audio generation device (not shown) is typically configured to generate audio for the user 200 according to received audio outputs corresponding to the gameplay events occurring. The audio generation device may be a headset having loudspeakers and a microphone or a speaker which may be embedded in another device such as a television speaker, a laptop speaker, a tablet speaker, a virtual assistant module speaker, an in-vehicle speaker, and the like. More than one speaker may be present, for example, in a surround sound-type setup. The speaker or speakers may be portable, for example, a Bluetooth® sound bar. The audio generation device may be further configured to detect and receive audio, for example, in the form of speech or 'voicechat', at the microphone for integration into the cloud-based video game.

Figure 3:
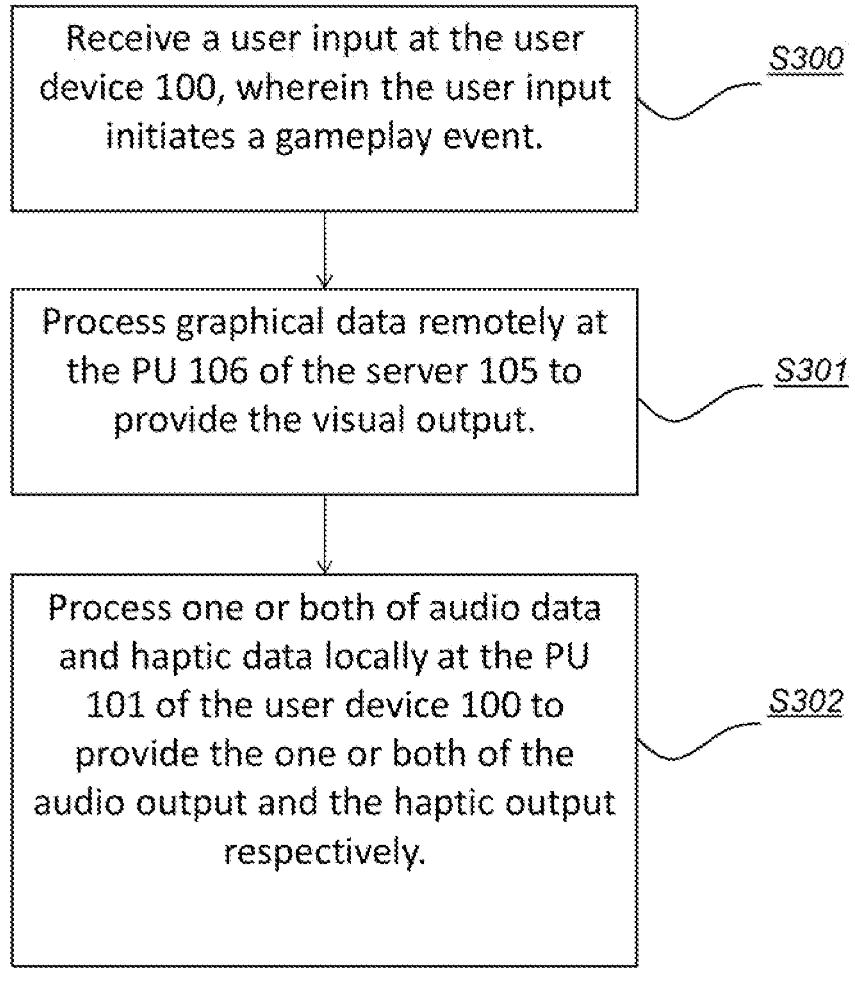
FIG. 3 illustrates an exemplary method of performing the invention.

Referring to FIG. 3, there is provided an exemplary method of performing the invention disclosed herein comprising steps S300, S301 and S302. Step S300 comprises receiving a user input at the user device 100, wherein the user input initiates a gameplay event, the gameplay event comprising a visual output and one or both of an audio output and a haptic output, each to be outputted locally at the local user device 100. The user input may be received by the controller 202. Step 301 comprises processing graphical data remotely at the PU 106 of the server 105 to provide the visual output of the gameplay event. The step S302 comprises processing one or both of audio data and haptic data locally at the PU 101 of the user device 100 to provide the one or both of the audio output and the haptic output of the gameplay event respectively. In the illustrated example, step S301 is performed before step S302, however, the invention is not limited in this regard as steps S301 and S302 may be performed in any order.

The visual output of the gameplay event and the audio and/or haptic output of the gameplay event are thereby provided and may then be respectively rendered. The latency between the instant of the user input and the instant of rendering the audio and/or haptic output is reduced by usefully processing the audio and/or haptic data at the local PU 101, when compared to conventional cloud gaming systems which process gameplay events in their entirety at a remote server.

Figure 4:
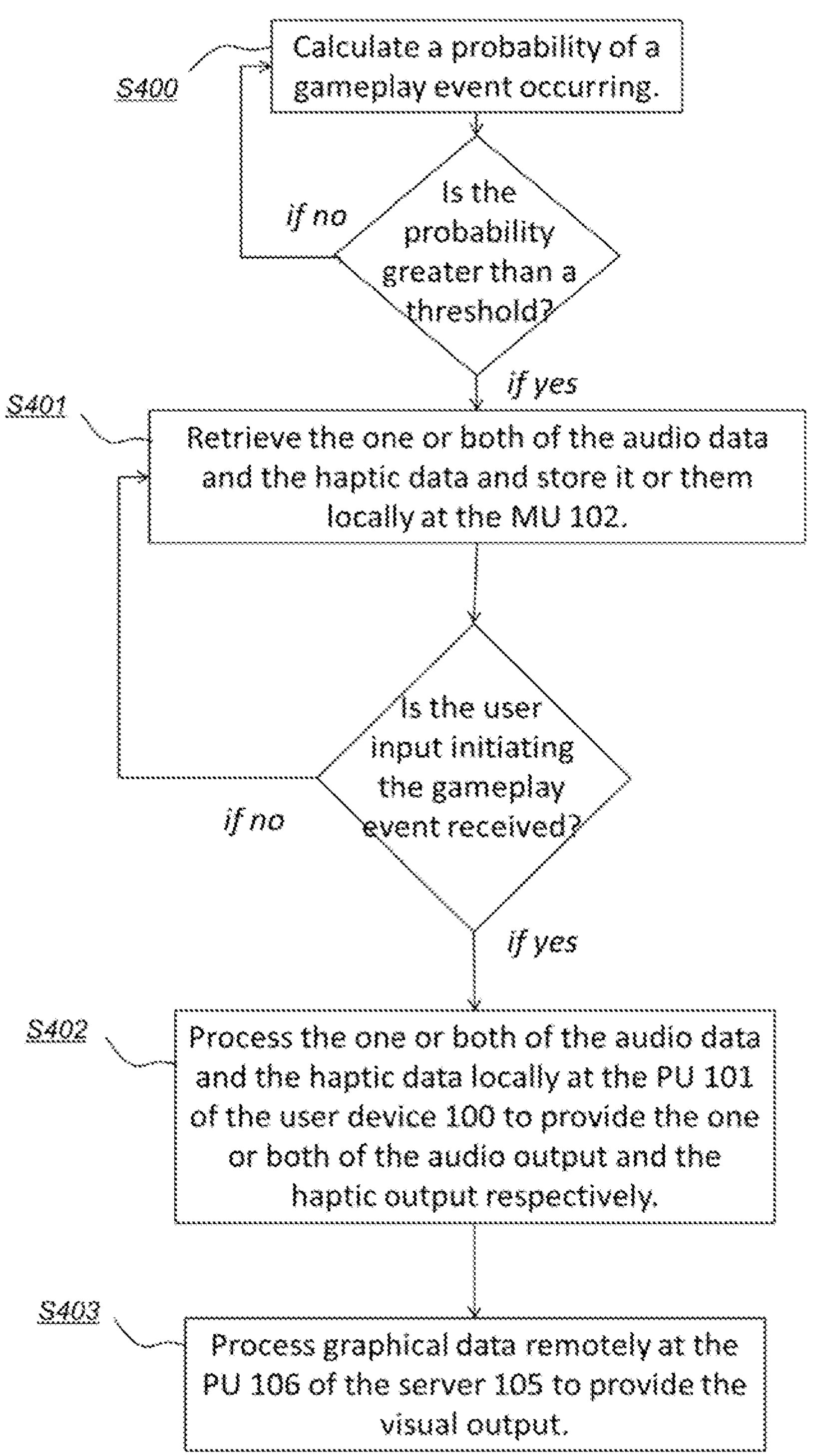
FIG. 4 illustrates another exemplary method of performing the invention.

Referring to FIG. 4, there is provided another exemplary method of performing the invention disclosed herein comprising steps S400, S401, S402 and S403. Step S400 comprises calculating, during gameplay and prior to receiving a user input initiating the gameplay event, a probability of the gameplay event occurring. If the probability is not greater than a threshold probability, the method comprises returning to restart the method from step S400. If the probability is greater than a threshold probability, the method proceeds to step S401. Step S401 comprises retrieving the one or both of the audio data and the haptic data from the server 105 and storing it or them locally at the MU 102 of the user device 100 to be processed locally at the PU 101 of the user device 100. If the user input is not received which initiates the gameplay event in question, the method comprises returning to restart the method from step S401. If the user input is received which initiates the gameplay event in question, the method proceeds to step S402. Step S402 comprises processing one or both of audio data and haptic data locally at the PU 101 of the user device 100 to provide the one or both of the audio output and the haptic output of the gameplay event respectively. Step 403 then comprises processing graphical data remotely at the PU 106 of the server 105 to provide the visual output of the gameplay event. In the illustrated example, step S402 is performed before step S403, however, the invention is not limited in this regard as steps S402 and S403 may be performed in any order.

The visual output of the gameplay event and the audio and/or haptic output of the gameplay event are thereby provided and may then be respectively rendered. The latency between the instant of the user input and the instant of rendering the audio and/or haptic output is reduced by selectively processing data locally, as with the exemplary method in FIG. 3, and further by pre-emptively retrieving data from the server 105 and storing it prior to processing at the user device (for example, in a local cache memory) according to a probability of occurrence of a gameplay event.

The probability of occurrence of the gameplay event may be calculated based on one or more of the user inputs received in a preceding time period; data associated with the gameplay events occurring in a preceding time period; data relating to the current state or progression of the gameplay; data associated with the user's gameplay history; and the like. Further, the probability may then be calculated using an algorithm comprising one or more of a confidence estimation; machine learning algorithm; a deep learning algorithm; and other statistical analysis methods. The threshold probability of occurrence of the gameplay event may be any sufficiently high probability of the anticipated gameplay event occurring that may be contemplated by a personal skilled in the art.

Figure 5:
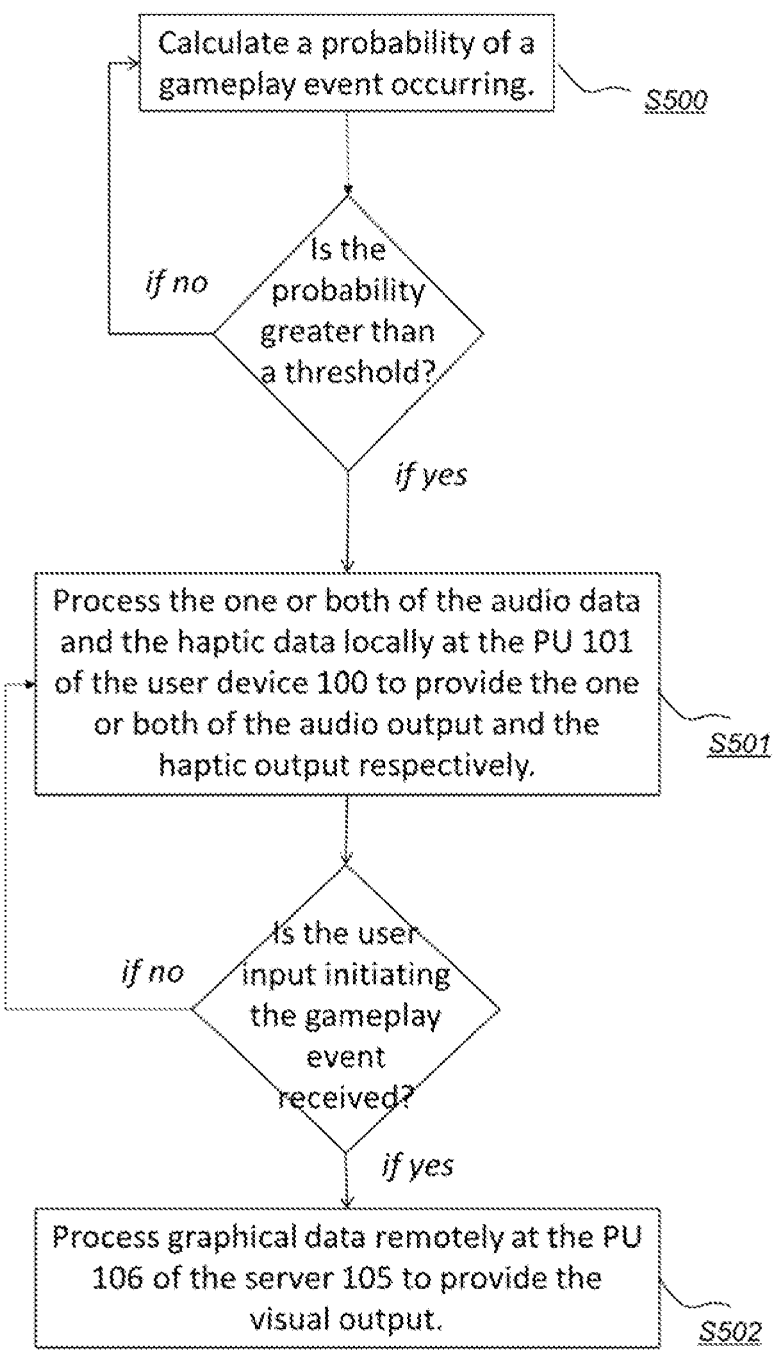
FIG. 5 illustrates another exemplary method of performing the invention.

Referring to FIG. 5, there is provided another exemplary method of performing the invention disclosed herein comprising steps S500, S501 and S502. Step S500 comprises calculating, during gameplay and prior to receiving a user input initiating the gameplay event, a probability of the gameplay event occurring. If the probability is not greater than a threshold probability, the method comprises returning to restart the method from step S500. If the probability is greater than a threshold probability, the method proceeds to step S501. Step S501 comprises processing one or both of audio data and haptic data locally at the PU 101 of the user device 100 to provide the one or both of the audio output and the haptic output of the gameplay event respectively. If the user input is not received which initiates the gameplay event in question, the method comprises returning to restart the method from step S501. If the user input is received which initiates the gameplay event in question, the method proceeds to step S502. Step S502 comprises processing graphical data remotely at the PU 106 of the server 105 to provide the visual output of the gameplay event.

The visual output of the gameplay event and the audio and/or haptic output of the gameplay event are thereby provided and may then be respectively rendered. The latency between the instant of the user input and the instant of rendering the audio and/or haptic output is reduced by selectively processing data locally, as with the exemplary method in FIG. 3, and further by pre-emptively processing audio and/or haptic data to provide the audio and/or haptic output according to a probability of occurrence of a gameplay event.

Figure 6:
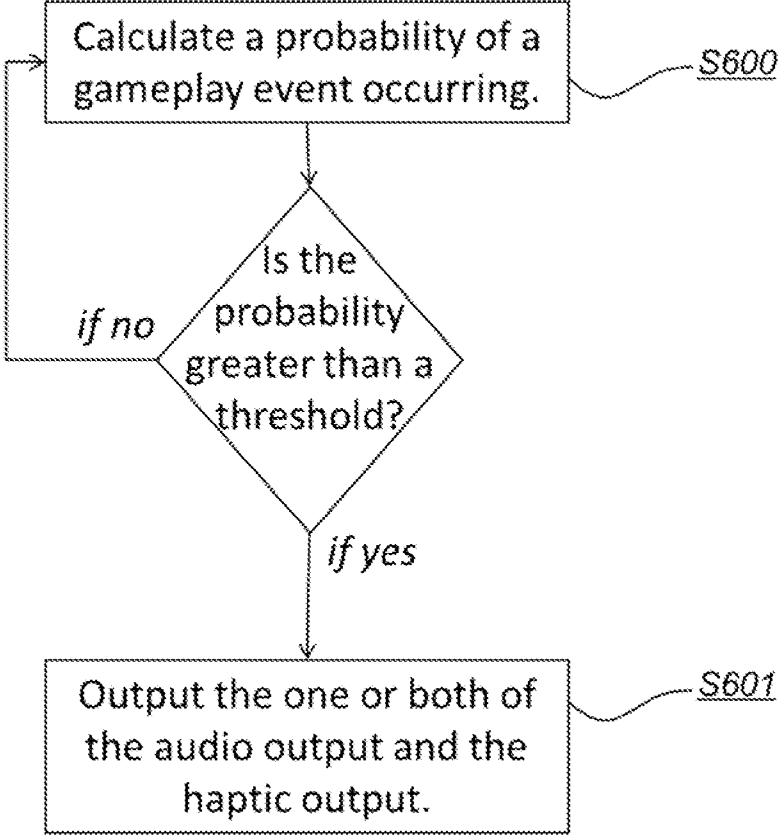
FIG. 6 illustrates another exemplary method of performing the invention.

Referring to FIG. 6, there is provided another exemplary method of performing the invention disclosed herein comprising steps S600 and S601. Step S600 comprises calculating, during gameplay and prior to receiving a user input initiating the gameplay event, a probability of the gameplay event occurring. If the probability is not greater than a threshold probability, the method comprises returning to restart the method from step S600. If the probability is greater than a threshold probability, the method proceeds to step S601. Step S601 comprises outputting the one or both of the audio output and the haptic output.

The visual output of the gameplay event and the audio and/or haptic output of the gameplay event are thereby provided and may then be respectively rendered. The latency between the instant of the user input and the instant of rendering the audio and/or haptic output is reduced by selectively processing data locally, as with the exemplary method in FIG. 3, and further by pre-emptively outputting the audio and/or haptic output prior to the user input according to a probability of occurrence of a gameplay event.

The methods described herein may be implemented by hardware, software, or a combination thereof. Where a software implementation is employed to implement an embodiment of the invention or any feature therein, it will be appreciated that such software, and any non-transitory machine-readable storage media by which such software is provided, are also to be considered embodiments of the invention.

The foregoing descriptions are merely exemplary embodiments of the invention and are not intended to limit the protection scope of the invention. Any variation, replacement or other embodiment readily contemplated by a person skilled in the art within the technical scope disclosed in the appended claims shall fall within the protection scope of the invention.

The invention claimed is:

1. A computer-implemented method comprising:

determining, by a local user device, that a user is likely to initiate a gameplay event that includes (a) a visual output and (b)(i) an audio output or (b)(ii) a haptic output, while the local user device streams a game over a network from a cloud-based gaming service;

in response to determining that the user is likely to initiate the gameplay event and before the user has actually initiated the gameplay event, storing audio data associated with the audio output or haptic data associated with the haptic output at the local user device;

receiving a user input at the local user device that initiates the gameplay event;

in response to receiving the user input at the local user device that initiates the gameplay event:

transmitting a request for graphical data associated with the visual output of the gameplay event over the network to the cloud-based gaming service, then receiving the graphical data associated with the visual output of the gameplay event from the cloud-based gaming service over the network, then providing, for output, the visual output of the gameplay event using the graphical data; and providing the audio output of the gameplay event using the stored audio data or the haptic output of the gameplay event using the haptic data.

2. The computer-implemented method of claim 1, wherein the audio output or the haptic output are provided for output independent of receiving the graphical data.

3. The computer-implemented method of claim 1, wherein the audio output or the haptic output are provided for output before the graphical data is received.

4. The computer-implemented method of claim 1, wherein the audio output or the haptic output are provided for output before the visual output is provided for output.

5. The computer-implemented method of claim 1, wherein storing audio data associated with the audio output or haptic data associated with the haptic at the local user device comprises:

before the user has actually initiated the gameplay event, transmitting a request over the network to the cloud-based gaming service for the audio data associated with the audio output of the gameplay event or for the haptic data that is associated with the haptic output of the gameplay event; and receiving, over the network from the cloud-based gaming service, the audio data associated with the audio output of the gameplay event or for the haptic data that is associated with the haptic output of the gameplay event.

6. The computer-implemented method of claim 1, wherein determining that a user is likely to initiate a gameplay event that includes a) a visual output and (b)(i) an audio output or (b)(ii) a haptic output, while the local user device streams a game over a network from a cloud-based gaming service comprises determining a probability that the user is likely to initiate the gameplay event while the local user device streams a game over a network from a cloud-based gaming service.

7. The computer-implemented method of claim 6, wherein the probability is determined based on at least one of prior user inputs from the local user device, prior data associated with the gameplay event, prior data relating to a current state of the gameplay event, or data associated with a history of the gameplay event.

8. The computer-implemented method of claim 6, wherein determining a probability that the user is likely to initiate the gameplay event while the local user device streams a game over a network from a cloud-based gaming service comprises determining the probability that the user is likely to initiate the gameplay event prior to receiving the user input at the local user device that initiates the gameplay event.

9. A system comprising:

one or more computers and one or more storage devices on which are stored instructions that are operable, when executed by the one or more computers, to cause the one or more computers to perform operations comprising:

determining, by a local user device, that a user is likely to initiate a gameplay event that includes (a) a visual output and (b)(i) an audio output or (b)(ii) a haptic output, while the local user device streams a game over a network from a cloud-based gaming service;

in response to determining that the user is likely to initiate the gameplay event and before the user has actually initiated the gameplay event, storing audio data associated with the audio output or haptic data associated with the haptic output at the local user device;

receiving a user input at the local user device that the gameplay event;

in response to receiving the user input at the local user device that initiates the gameplay event:

transmitting a request for graphical data associated with the visual output of the gameplay event over the network to the cloud-based gaming service, then receiving the graphical data associated with the visual output of the gameplay event from the cloud-based gaming service over the network, then providing, for output, the visual output of the gameplay event using the graphical data; and providing the audio output of the gameplay event using the stored audio data or the haptic output of the gameplay event using the haptic data.

10. The system of claim 9, wherein the audio output or the haptic output are provided for output independent of receiving the graphical data.

11. The system of claim 9, wherein the audio output or the haptic output are provided for output before the graphical data is received.

12. The system of claim 9, wherein the audio output or the haptic output are provided for output before the visual output is provided for output.

13. The system of claim 9, wherein storing audio data associated with the audio output or haptic data associated with the haptic output at the local user device comprises:

before the user has actually initiated the gameplay event, transmitting a request over the network to the cloud-based gaming service for the audio data associated with the audio output of the gameplay event or for the haptic data that is associated with the haptic output of the gameplay event; and receiving, over the network from the cloud-based gaming service, the audio data associated with the audio output of the gameplay event or for the haptic data that is associated with the haptic output of the gameplay event.

14. The system of claim 9, wherein determining that a user is likely to initiate a gameplay event that includes a) a visual output and (b)(i) an audio output or (b)(ii) a haptic output, while the local user device streams a game over a network from a cloud-based gaming service comprises determining a probability that the user is likely to initiate the gameplay event while the local user device streams a game over a network from a cloud-based gaming service.

15. The system of claim 14, wherein the probability is determined based on at least one of prior user inputs from the local user device, prior data associated with the gameplay event, prior data relating to a current state of the gameplay event, or data associated with a history of the gameplay event.

16. The system of claim 14, wherein determining a probability that the user is likely to initiate the gameplay event while the local user device streams a game over a network from a cloud-based gaming service comprises determining the probability that the user is likely to initiate the gameplay event prior to receiving the user input at the local user device that initiates the gameplay event.

17. One or more non-transitory computer storage media encoded with computer program instructions that when executed by one or more computers cause the one or more computers to perform operations comprising:

determining, by a local user device, that a user is likely to initiate a gameplay event that includes (a) a visual output and (b)(i) an audio output or (b)(ii) a haptic output, while the local user device streams a game over a network from a cloud-based gaming service;

in response to determining that the user is likely to initiate the gameplay event and before the user has actually initiated the gameplay event, storing audio data associated with the audio output or haptic data associated with the haptic output at the local user device;

receiving a user input at the local user device that the gameplay event;

in response to receiving the user input at the local user device that initiates the gameplay event:

transmitting a request for graphical data associated with the visual output of the gameplay event over the network to the cloud-based gaming service, then receiving the graphical data associated with the visual output of the gameplay event from the cloud-based gaming service over the network, then providing, for output, the visual output of the gameplay event using the graphical data; and providing the audio output of the gameplay event using the stored audio data or the haptic output of the gameplay event using the haptic data.

18. The one or more non-transitory computer storage media of claim 17, wherein the audio output or the haptic output are provided for output independent of receiving the graphical data.

19. The one or more non-transitory computer storage media of claim 17, wherein the audio output or the haptic output are provided for output before the graphical data is received.

20. The one or more non-transitory computer storage media of claim 17, wherein the audio output or the haptic output are provided for output before the visual output is provided for output.

* * * * *